(12) United States Patent
Fritzler et al.

(10) Patent No.: US 7,253,416 B2
(45) Date of Patent: Aug. 7, 2007

(54) RADIATION DETECTOR AND DETECTION METHOD, AND MEDICAL DIAGNOSTIC APPARATUS EMPLOYING SAME

(75) Inventors: Sven Fritzler, Erlangen (DE); Björn Heismann, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/222,875

(22) Filed: Sep. 9, 2005

(65) Prior Publication Data

US 2006/0054828 A1 Mar. 16, 2006

(30) Foreign Application Priority Data

Sep. 9, 2004 (DE) .................. 10 2004 043 693

(51) Int. Cl.
*G01T 1/24* (2006.01)
(52) U.S. Cl. .................................................. 250/370.1
(58) Field of Classification Search ............. 250/370.1
See application file for complete search history.

(56) References Cited

U.S. PATENT DOCUMENTS

| | | | | |
|---|---|---|---|---|
| 5,608,221 A | * | 3/1997 | Bertelsen et al. | 250/363.03 |
| 5,760,401 A | * | 6/1998 | Nelleman et al. | 250/363.03 |
| 5,818,050 A | * | 10/1998 | Dilmanian et al. | 250/363.09 |
| 6,103,147 A | * | 8/2000 | Rybicki | 264/1.21 |
| 6,232,607 B1 | * | 5/2001 | Huang | 250/370.09 |
| 6,445,767 B1 | * | 9/2002 | Karellas | 378/98.8 |
| 6,576,907 B1 | * | 6/2003 | Klein et al. | 250/369 |
| 6,823,038 B2 | | 11/2004 | Von Der Haar | |
| 6,909,097 B2 | * | 6/2005 | Schreiner et al. | 250/366 |
| 7,022,995 B2 | * | 4/2006 | Tumer | 250/370.09 |
| 2004/0084625 A1 | * | 5/2004 | Williams et al. | 250/363.03 |
| 2005/0104002 A1 | * | 5/2005 | Shah | 250/363.03 |
| 2005/0109943 A1 | * | 5/2005 | Vaquero et al. | 250/363.04 |
| 2005/0253076 A1 | * | 11/2005 | Wollenweber et al. | 250/363.09 |

FOREIGN PATENT DOCUMENTS

DE G 92 13 292.8 1/1993

* cited by examiner

*Primary Examiner*—David Porta
*Assistant Examiner*—Marcus Taningco
(74) *Attorney, Agent, or Firm*—Schiff Hardin LLP

(57) ABSTRACT

In a detector arrangement for a medical diagnosis apparatus as well as a medical imaging diagnostic method, radiation quanta striking a detector are detected and evaluated with spatial resolution. The use of collimators is thereby omitted, such that radiation quanta that strike at a non-perpendicular angle to the detector are also evaluated. For spatial resolution of the origin of the radiation quantum, the spatial distribution of sensor elements of the detector that emit a signal upon incidence of a radiation quantum is evaluated. A higher efficiency of the radiation evaluation is enabled and, particularly in nuclear medical diagnostic methods, the radiation exposure of the patient can be distinctly reduced.

27 Claims, 2 Drawing Sheets

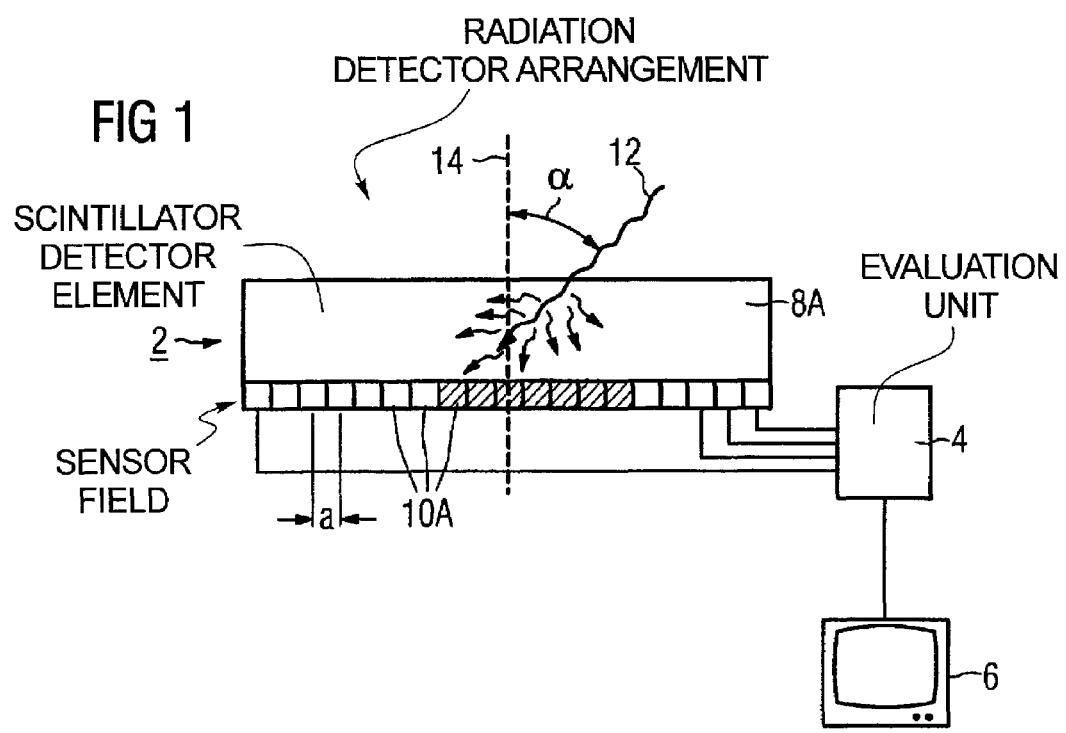
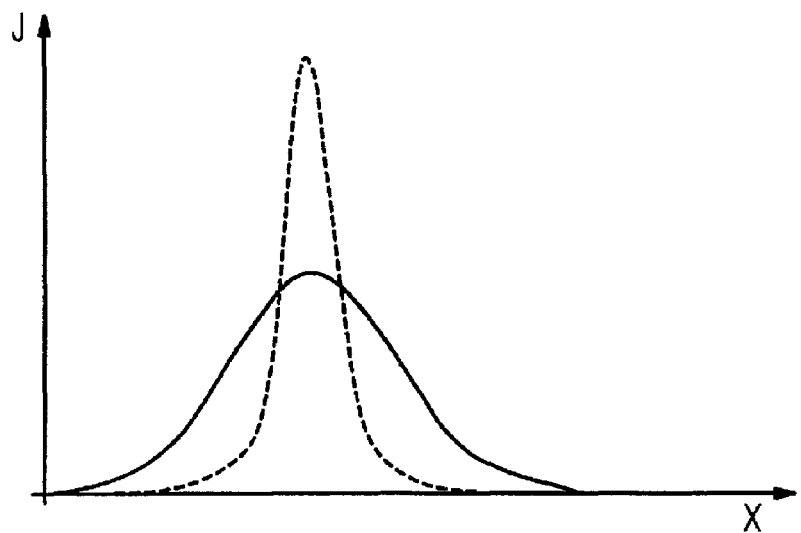

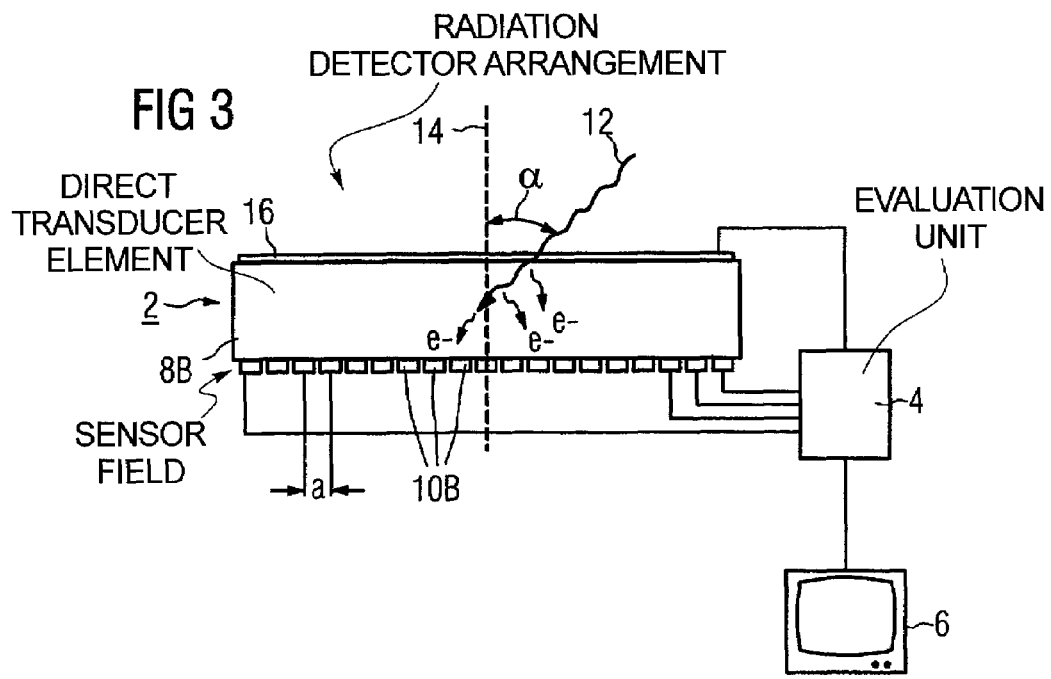
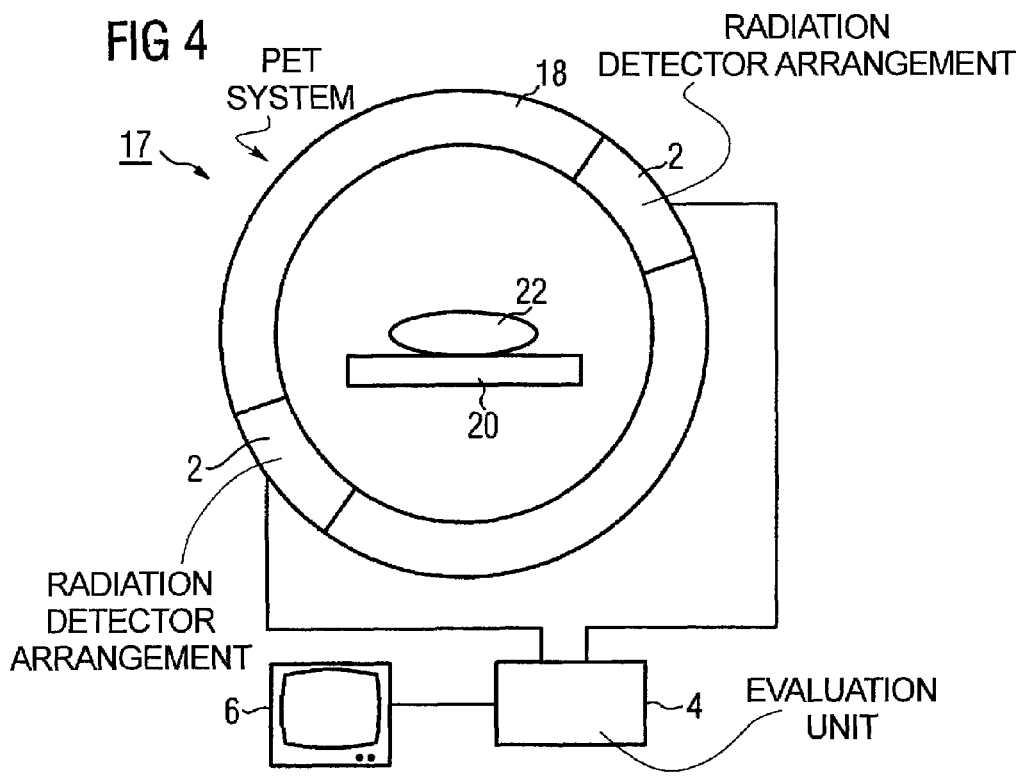

RADIATION DETECTOR AND DETECTION METHOD, AND MEDICAL DIAGNOSTIC APPARATUS EMPLOYING SAME

BACKGROUND OF THE INVENTION

1. Field of the Invention

The present invention concerns a radiation detector arrangement for a medical diagnostic apparatus, a medical diagnostic system with such a detector arrangement, as well as a medical imaging diagnostic method.

2. Description of the Prior Art

Various imaging diagnostic methods are known in the field of medicine, such as, for example, computed tomography (CT), in which the patient to be examined is irradiated with x-rays from a number of different directions and the x-rays are detected by a detector as projection datasets, which are combined for generation of an image.

In addition to this method based on x-ray radiation, what are known as nuclear medicine methods also are known such as, for example, PET diagnostics (positron emission tomography) and SPECT diagnostics (single photon emission computed tomography). In each of these modalities, the patient is injected with a radioactive substance and the radiation emanating from this substance is detected with the detector and used for image processing.

For precise spatial resolution of the point of origin of the emitted or transmitted radiation, collimators are disposed upstream of the detectors, the collimators being formed by a number of individual collimator plates (known as septa (singular: septum) that are oriented so that essentially only radiation portions incoming perpendicularly on the detector surface are detected. Therefore only a part of the total radiation is used for the image generation. In order to have sufficient information for the image generation, the patient therefore must be exposed with a relatively high radiation dose.

SUMMARY OF THE INVENTION

The invention is based on the object to enable an improved efficiency in the detection of radiation in medical imaging methods.

This object is achieved according to the invention by a detector arrangement for a medical diagnostic apparatus having a detector with a radiation-sensitive detector element and a sensor field (associated with the detector element) with a number of sensor elements arranged like a matrix. An evaluation unit for spatially-resolved evaluation of electrical signals from the sensor elements is connected with the sensor field. This evaluation unit is fashioned so that, upon a radiation quantum striking the detector element, the sensor element affected by this event is identified and the radiation direction of the detected radiation quantum is derived from its spatial distribution.

In comparison a conventional detector arrangement with the collimator placed in front of the detectors, the inventive detector arrangement in that it also allows lateral radiation incidence and radiation incidence oriented at non-perpendicular angle onto the detector. In order to be able to localize the origin of this radiation, the radiation direction (thus the direction of incidence of the respective radiation quantum) is derived from the detected measurement values. The detector arrangement therefore also enables the spatial resolution required for the medical imaging without the use of collimators. The decisive advantage is thereby achieved of no collimators being necessary and a significantly higher fraction of the available radiation is evaluated and used for the imaging. In particular in the nuclear imaging modalities (SPECT, PET), in which the radiation is distributed over the entire examination volume and is not specific due to the nuclear decay, the invention achieves a significant increase in efficiency, i.e. the available radiation is used more efficiently for image generation. In the reverse, this means that the dose to be administered to the patient can be smaller. The exposure of the patient is thereby reduced.

Additionally, a significant technical simplification in the technical complexity of the apparatus and therewith a significant cost savings are achieved via the omission of the collimators. The collimators are typically extremely delicate, position-sensitive and therewith very elaborate to manufacture.

The basic underlying concept of this collimator-free detector arrangement is that a number of photons, which are subsequently detected by the sensor elements, are generated along the path (signal track) of the radiation quantum in the scintillator upon impact of an x-ray or gamma quantum on the detector element (for example a scintillator). The size of the light spot imaged (mapped) upon impact of the radiation quantum on the sensor field depends on the radiation direction of the radiation quantum with regard to the surface normal of the detector element. If the radiation quantum strikes nearly parallel to the surface normal, photons are generated only in the immediate impact area. By contrast, if the radiation strikes at a comparably large angle relative to the surface normal, photons are generated in a larger-area region. The sensor elements are therefore more or less affected by the impact event dependent on the incoming radiation direction. The spatial distribution of the sensor elements of the sensor field thus emit a signal that varies dependent on the direction of incoming radiation.

In an embodiment, the evaluation electronic is designed so that the signal intensity and/or the signal energy of the individual signals transmitted by the sensor elements are additionally detected. Using this additional information, not only is information obtained about in the spatial region within which a signal has been generated, but also information about the intensity and/or energy, which can be evaluated in order to more precisely determine the its angle of incidence from the track path of the radiation quantum.

The evaluation electronics furthermore can be designed so that the signal track generated by the radiation quantum is evaluated with regard to its length, its start location, its end location as well as with regard to its intensity/energy. This embodiment is based on the recognition that the three-dimensional orientation of the radiation direction can be determined from the two-dimensional position and orientation of the signal track on the sensor matrix field, by inclusion of the intensity/energy measured for the signal track. In fact, if a radiation quantum strikes at only a small angle with regard to the surface normal of the detector, the signal track is shorter in comparison with a radiation quantum striking the detector at a flatter angle.

In order to achieve a sufficiently high spatial resolution, the average separation between two adjacent sensor elements is <1 mm according to an embodiment. The size (aperture) of each sensor element is therefore <1 mm. The average separation preferably is in the range between 10 μm and 500 μm.

In an embodiment the detector arrangement is designed for an angular resolution of approximately 0.01° to 0.50°, in particular for an angular resolution of at least 0.15°. This means that rays that deviate from one another at these specified angles are evaluated as originating from different locations. Given a typical separation of 40 cm from the patient, a spatial resolution of 1 mm can be achieved with the angular resolution of at least 0.15°; this means that examination volumes that are separated from one another b 1 mm are differentiable.

In an embodiment of the detector, the detector element is a scintillator and the sensor elements are photosensor elements.

In a further embodiment, the detector element is what is known as a direct transducer element, at one side of which a first planar electrode is arranged. The sensor elements are counter-electrodes arranged like a matrix on the side opposite the first electrode. The direct transducer element is, for example, made from a system composed of CdTe, CdZnTe or Hgl.

Such a detector arrangement is preferably used in a medical diagnostic system for a nuclear medical diagnostic modality such as PET or SPECT. As an alternative to use in a nuclear medical diagnostic modality, the detector arrangement can be used in an x-ray medical diagnostic method, in particular in a computed tomography system. The use of the detector arrangement leads to a higher efficiency of the radiation evaluation, as well as to an apparatus simplification due to the omission of a collimator, and additionally to a lower exposure of the patient, in particular in the nuclear medical diagnostic modality (which is of decisive importance in the medical field).

The above object is furthermore achieved according to the invention by a collimator-free medical imaging diagnostic method wherein the incoming directions of respective radiation quanta are detected and evaluated. The advantages and preferred embodiments mentioned with regard to the detector arrangement are applicable to the method.

For determination of the radiation direction of the incident radiation quantum, in an embodiment of the method the respective detected measurement values are compared with reference values stored in a memory of the evaluation unit and the radiation direction is determined from this comparison. The reference values are determined, for example, by simulation or by reference measurements with defined radiation intensity and radiation direction.

For an optimally efficient evaluation, all radiation quanta that occur at an angle of incidence of 0° to approximately 70° (relative to the surface normals of the detector) are detected and evaluated.

Given use for computed tomography, radiation portions that (relative to the surface normals) strike at an angle on the detector are preferably identified as scatter radiation and are not further used for imaging. Interfering scatter radiation portions therefore can be eliminated in this manner without the use of a collimator.

DESCRIPTION OF THE DRAWINGS

FIG. 1 schematically illustrates a detector arrangement according to a first embodiment of the invention.

FIG. 2 is an intensity curve detected by the inventive detector.

FIG. 3 schematically illustrates a second embodiment of a detector arrangement according to the invention.

FIG. 4 is a simplified representation of an inventive medical imaging system in the embodiment of a PET diagnostic system.

DESCRIPTION OF THE PREFERRED EMBODIMENTS

As shown in FIGS. 1 and 3, a detector arrangement HAS a detector 2, an evaluation unit 4 as well as a display element 6 connected with the evaluation unit 4. The detector 2 in FIG. 1 has a detector element 8A as well as a sensor field, arranged on the underside of the detector element 8A, with a number of sensor elements 10A arranged in a matrix. The detector 2 in FIG. 3 has a detector element 8B and sensor elements 10B. In each embodiment, the average separation a of two adjacent sensor elements 10A, 10B (thus the average separation a between their center points) is in the range between 10 µm-500 µm. Each of the sensor elements 10A, 10B in the matrix is connected with the evaluation unit 4. For better clarity, in the FIGS. 1 and 3 only some of the sensor elements 10A, 10B are shown connected with the evaluation unit 4.

In the exemplary embodiment of FIG. 1, the detector element 8A is a scintillator and the sensor elements 10A are photosensor elements. The sensor field is formed as a matrix field comprised of individual semiconductor sensors.

If an x-ray quantum or a gamma quantum (designated as a radiation quantum 12 in the following) strikes the scintillator 8A, the radiation quantum 12 leaves a "scintillation track" in the scintillator 10A and multiple photons (secondary radiation) are generated along the path of the radiation quantum 12. In the exemplary embodiment, the radiation quantum 12 is incident at an angle to the surface normal 14 of the scintillator 8A. Since photons are generated over the entire path, a number of the individual photosensor elements 10A react to this incident radiation quantum 12 (impact event) and each emits an electrical signal to the evaluation unit 4. The affected sensor elements 10A are characterized in FIG. 1 by a hatching.

The signal emitted to the evaluation unit 4 is in particular a current signal, the intensity of which depends on the number of incident photons per readout cycle on the respective photosensor element 10A. "Readout cycle," means the time period between two readout events for a respective photosensor element 10A. The incident photons within this time span are "added"; the photosensor element 10A therefore forms an integral over the incident photons.

Subsequently, the affected sensor elements 10A, 10B are identified for evaluation and determination of the radiation direction, meaning that the evaluation unit 4 detects which sensor elements 10A, 10B are affected by the incidence of the radiation quantum 12 using the signals transmitted from the affected sensor elements 10A, 10B. The evaluation electronics and evaluation logic of the evaluation unit 4 are designed so that, given the expected number of incident radiation quanta 12 per time unit, each individual event is detected as such and evaluated. In a PET examination, this number is approximately 1000 events per second and per $mm^2$ of detector surface.

A determined spatial distribution that corresponds to the sensor area irradiated by the photons results via the identification of the sensor elements 10A affected by the respective event. The signal intensities (the current peak of the signals emitted by the individual sensor elements 10A) are also detected and evaluated by the evaluation unity. A three-dimensional intensity curve (of which a two-dimensional version is shown in FIG. 2) can be determined using these measurement values. In this representation, the intensity J is plotted against the position of the respective sensor element 10A in the X-direction of the sensor field. The intensity distribution in the Y-direction is also simultaneously detected (not shown here).

Intensity curves for an angled incidence (solid curve) and a substantially perpendicular incidence (dashed curve) of the radiation quantum 12 are shown in FIG. 2. Given a large angle of incidence α relative to the surface normal 14 of the detector element 8A, the sensor field is irradiated by photons over a large area so that a relatively broad spatial distribution is formed (solid line). In contrast to this, if the radiation quantum 12 strikes essentially perpendicularly, the angle of incidence α is very small or zero, and photons are only generated in a very narrowly limited area and only a few sensor elements 10A are irradiated. Only a narrowly limited local distribution of the affected sensor elements 10A and a rather tight intensity distribution therefore result.

For the determination of the angle of incidence α, it is sufficient in a first approximation to identify the affected sensor elements 10A and to determine the irradiated surface area of the sensor field. A specific angle of incidence of the invention α is statistically associated with each area size.

The signal intensity and/or the signal energy preferably is/are additionally used for determination of the angle of incidence α. A more precise determination can be effected using the intensity distribution. Iterative conclusions about the radiation curve can be derived given an asymmetrical intensity distribution. Overall an unambiguous association with the angle of incidence α is enabled using the signal width. The angle of incidence of the radiation quantum 12 relative to the X-Y plane directly results from the position and orientation of the appertaining sensor elements 10A of the sensor field.

The radiation direction is respectively calculated dynamically (online) in the evaluation unit 4 from the individual measurement data. As an alternative, a storage element (not shown) can be provided in which reference values (in particular reference aspects or reference distributions) are stored. A specific radiation direction is thereby associated with a respective curve, such that the radiation direction is determined by a comparison with these reference curves.

The evaluation with the detector arrangement of FIG. 3 ensues according to the same principle. In contrast to the exemplary embodiment according to FIG. 1, the detector element 8B is a direct transducer element. A first electrode 16 is arranged on its upper side and a number of counter-electrodes arranged like a matrix, and forming the individual sensor elements 10B, are arranged on the opposite side. The direct transducer element 8B is based on the principle that, upon impact of a radiation quantum 12, electrons are released in the direct transducer element and these released electrons are attracted toward the counter-electrodes 8B by a voltage applied across the electrodes 16, 8B. As in the exemplary embodiment according to FIG. 1, a spatially resolved detection and a spatially resolved intensity distribution are thus likewise enabled.

The use of the detector arrangement in a PET system 17 is illustrated in FIG. 4. Such a diagnostic system typically has an examination tunnel 18 within which the patient 22 to be examined is located on a patient bed 20. Radiopharmaceuticals are injected into the patient 22 prior to the examination. In a PET examination these are positron radiators. The injected radiopharmaceuticals particularly concentrate in regions with high metabolism. Upon decay, positrons are created that immediately combine with electrons. Two gamma quanta are thereby created in opposite directions. The evaluation in a PET system is based on a coincidence measurement. Two opposite detectors 22 are therefore provided in a PET system. Both are connected with a common evaluation unit 4 that is in turn connected to a display element 6. Furthermore, the system 17 has operating, input and output devices (not shown in detail here). The detectors 2 can be moved around the patient 22. As an alternative, a number of circular detectors 2 arranged around the patient 22 can also be provided.

Due to the use of the detector arrangement 2, such a medical diagnostic system 17 is characterized by collimator-free detection of the radiation over a large angular range. Due to the omission of collimators, not just radiation quanta striking parallel to the surface normal 14 are detected. Radiation quanta also are detected that strike the detector 2 through a very large range of the inclination angle α of nearly 0 to 70°.

Although modifications and changes may be suggested by those skilled in the art, it is the intention of the inventors to embody within the patent warranted hereon all changes and modifications as reasonably and properly come within the scope of their contribution to the art.

We claim as our invention:

1. A radiation detector arrangement for a medical diagnostic apparatus comprising:
    a radiation detector comprising a radiation-sensitive detector element, a sensor field, and an evaluation unit;
    said detector element emitting emitted energy upon passage of a radiation quantum therethrough;
    said sensor field comprising a plurality of sensor elements in a matrix, each sensor element emitting an electrical signal corresponding to secondary radiation incident thereon, each electrical signal having a signal intensity and a signal energy; and
    said evaluation unit identifying affected sensor elements, from among said plurality of sensor elements, that emit an electrical signal upon passage of said radiation quantum through said detector element, said radiation quantum generating a signal track across said affected sensor elements, said signal track having a beginning location, a length, and an end location, and determining a spatial distribution of said affected sensor elements from said beginning location, said length, and said end location, and, from said spatial distribution, determining a direction of incidence of said radiation quantum on said detector element.

2. A detector arrangement as claimed in claim 1 wherein said detector element is a collimator-free detector element.

3. A detector arrangement as claimed in claim 1 wherein adjacent sensor elements in said matrix have an average separation therebetween of less than 1 mm.

4. A detector arrangement as claimed in claim 3 wherein said average separation is in a range between 10 μm and 500 μm.

5. A detector arrangement as claimed in claim 1 wherein said detector element is a scintillator, said secondary radiation is comprised of photons, and said sensor elements are photosensor elements.

6. A detector arrangement as claimed in claim 1 wherein said detector element is a direct transducer element having first and second opposite sides, disposed in succession along said direction, said direct transducer element having an electrode on said first side and said sensor elements respectively forming counter-electrodes on said second side.

7. A detector arrangement comprising:
    a radiation detector comprising a radiation-sensitive detector element, a sensor field, and an evaluation unit;
    said detector element emitting emitted energy upon passage of a radiation quantum therethrough;

said sensor field comprising a plurality of sensor elements in a matrix, each sensor element affected by said emitted energy emitting an electrical signal; and said evaluation unit identifying affected sensor elements, from among said plurality of sensor elements, that emit an electrical signal upon passage of said radiation quantum through said detector element, said radiation quantum generating generates a signal track across said affected sensor elements, said signal track having a beginning location, a length, and an end location, and said evaluation unit determining a spatial distribution of said affected sensor elements from said beginning location, said length, and said end location and, from said spatial distribution, determining a direction of incidence of said radiation quantum on said detector element.

8. A detector arrangement comprising:

a radiation detector comprising a radiation-sensitive detector element, a sensor field, and an evaluation unit;

said detector element emitting emitted energy upon passage of a radiation quantum therethrough;

said sensor field comprising a plurality of sensor elements in a matrix, each sensor element affected by said emitted energy emitting an electrical signal;

said evaluation unit identifying affected sensor elements, from among said plurality of sensor elements, that emit an electrical signal upon passage of said radiation quantum through said detector element; and said sensor field and said evaluation unit, in combination, having an angular resolution for said direction in a range between 0.01° and 0.50°.

9. A detector arrangement as claimed in claim 8 wherein said sensor field and said evaluation unit, in combination, have an angular resolution for said direction of at least 0.14°.

10. A detector arrangement as claimed in claim 8 wherein said detector element is a collimator-free detector element.

11. A detector arrangement as claimed in claim 8 wherein adjacent sensor elements in said matrix have an average separation therebetween of less than 1 mm.

12. A detector arrangement as claimed in claim 11 wherein said average separation is in a range between 10 μm and 500 μm.

13. A detector arrangement as claimed in claim 8 wherein said detector element is a scintillator, said secondary radiation is comprised of photons, and said sensor elements are photosensor elements.

14. A detector arrangement as claimed in claim 8 wherein said detector element is a direct transducer element having first and second opposite sides, disposed in succession along said direction, said direct transducer element having an electrode on said first side and said sensor elements respectively forming counter-electrodes on said second side.

15. A nuclear medical diagnostic system comprising:

an arrangement adapted for interaction with an examination subject to introduce an agent into the examination subject that causes emission of radiation from an interior of the subject; and a detector arrangement for detecting said radiation, said detector arrangement comprising a radiation detector comprising a radiation-sensitive detector element, a sensor field, and an evaluation unit, said detector element emitting secondary radiation upon passage of a radiation quantum therethrough, said sensor field comprising a plurality of sensor elements in a matrix, each sensor element emitting an electrical signal corresponding to secondary radiation incident thereon, each electrical signal having a signal intensity and a signal energy, and said evaluation unit identifying affected sensor elements, from among said plurality of sensor elements, that emit an electrical signal upon passage of said radiation quantum through said detector element, said radiation Quantum generating a signal track across said affected sensor elements, said signal track having a beginning location, a length, and an end location, and said evaluation unit determining a spatial distribution of said affected sensor elements from said beginning location, said length, and said end location and, from said spatial distribution, said signal intensity and said signal energy, determining a direction of incidence of said radiation quantum on said detector element.

16. An x-ray medical diagnostic system comprising:

an x-ray source that emits x-rays into an examination subject thereby producing radiation attenuated by the subject; and a detector arrangement for detecting said radiation, said detector arrangement comprising a radiation detector comprising a radiation-sensitive detector element, a sensor field, and an evaluation unit, said detector element emitting secondary radiation upon passage of a radiation quantum therethrough, said sensor field comprising a plurality of sensor elements in a matrix, each sensor element emitting an electrical signal corresponding to secondary radiation incident thereon, each electrical signal having a signal intensity and a signal energy, and said evaluation unit identifying affected sensor elements, from among said plurality of sensor elements, that emit an electrical signal upon passage of said radiation quantum through said detector element, said radiation quantum generating a signal track across said affected sensor elements, said signal track having a beginning location, a length, and an end location, and said evaluation unit determining a spatial distribution of said affected sensor elements and, from said spatial distribution, said signal intensity and said signal energy, determining a direction of incidence of said radiation quantum on said detector element.

17. An x-ray medical diagnostic system as claimed in claim 16 wherein said x-ray source and said detector arrangement form an x-ray computed tomography scanner.

18. A method for detecting radiation emitted in a medical diagnostic apparatus, comprising the steps of:

disposing a detector element in a path of a radiation quantum, said detector element emitting emitted energy upon passage of said radiation quantum therethrough;

with a sensor field comprising a plurality of sensor elements in a matrix, emitting respective electrical signals from sensor elements affected by said emitted energy; and electronically identifying affected sensor elements, from among said plurality of sensor elements, that emit an electrical signal upon passage of said radiation quantum through said detector element and determining a spatial distribution of said affected sensor elements and, from said spatial distribution, determining a direction of incidence of said radiation quantum on said detector element by electronically storing a plurality of different reference spatial distributions, each having a direction associated therewith, and comparing said spatial distribution of said affected sensor elements with said stored reference spatial distributions and using the direction associated with a reference spatial distribution, closest to said spatial distribution, as said direction of said radiation quantum.

19. A method as claimed in claim 18 wherein signals has a signal intensity and a signal energy, and comprising electronically additionally identifying at least one of said signal intensity and said signal energy and electronically using said at least one of said signal intensity and said signal energy, in addition to said spatial distribution, to determine said direction.

20. A method detecting radiation emitted in a medical diagnostic apparatus, comprising:
    disposing a detector element in a path of a radiation quantum, said detector element emitting emitted energy upon passage of said radiation quantum therethrough, said detector element has having a surface normal;
    with a sensor field comprising a plurality of sensor elements in a matrix, emitting respective electrical signals from sensor elements affected by said emitted energy; and
    electronically identifying affected sensor elements, from among said plurality of sensor elements, that emit an electrical signal upon passage of said radiation quantum through said detector element by detecting and evaluating only radiation quanta striking said detector element with angle of incidence in a range between 0° and substantially 70° relative to said surface normal, and determining a spatial distribution of said affected sensor elements and, from said spatial distribution, determining a direction of incidence of said radiation quantum on said detector element.

21. A method as claimed in claim 20 wherein each of said signals has a signal intensity and a signal energy corresponding to the emitted energy affecting the sensor element from which that electrical signal was emitted, and comprising electronically additionally identifying at least one of said signal intensity and said signal energy and electronically using said at least one of said signal intensity and said signal energy, in addition to said spatial distribution, to determine said direction.

22. A method for detecting radiation emitted in a medical diagnostic apparatus, comprising:
    disposing a detector element in a path of a radiation quantum, said detector element emitting emitted energy upon passage of said radiation quantum therethrough, said detector element having a surface normal;
    with a sensor field comprising a plurality of sensor elements in a matrix, emitting respective electrical signals from sensor elements affected by said emitted energy; and
    electronically identifying affected sensor elements, from among said plurality of sensor elements, that emit an electrical signal upon passage of said radiation quantum through said detector element and determining a spatial distribution of said affected sensor elements and, from said spatial distribution, determining a direction of incidence of said radiation quantum on said detector element by designating a maximum angle of said direction relative to said surface normal, and identifying any x-ray quanta having a direction exceeding said maximum angle as scatter radiation.

23. A method as claimed in claim 22 wherein each of said signals has a signal intensity and a signal energy corresponding to the emitted energy affecting the sensor element from which that electrical signal was emitted, and comprising electronically additionally identifying at least one of said signal intensity and said signal energy and electronically using said at least one of said signal intensity and said signal energy, in addition to said spatial distribution, to determine said direction.

24. A nuclear medical diagnostic system comprising:
    an arrangement adapted for interaction with an examination subject to introduce an agent into the examination subject that causes emission of radiation from an interior of the subject; and
    a detector arrangement for detecting said radiation, said detector arrangement comprising a radiation detector comprising a radiation-sensitive detector element, a sensor field, and an evaluation unit, said detector element emitting emitted energy upon passage of a radiation quantum therethrough, said sensor field comprising a plurality of sensor elements in a matrix, each sensor element affected by said emitted energy emitting an electrical signal, and said evaluation unit identifying affected sensor elements, from among said plurality of sensor elements, that emit an electrical signal upon passage of said radiation quantum through said detector element, said radiation quantum generating a signal track across said affected sensor elements, said signal track having a beginning location, a length, and an end location, and determining a spatial distribution of said affected sensor elements from said beginning location, said length, and said end location and, from said spatial distribution, determining a direction of incidence of said radiation quantum on said detector element.

25. A nuclear medical diagnostic system comprising:
    an arrangement adapted for interaction with an examination subject to introduce an agent into the examination subject that causes emission of radiation from an interior of the subject; and
    a detector arrangement for detecting said radiation, said detector arrangement comprising a radiation detector comprising a radiation-sensitive detector element, a sensor field, and an evaluation unit, said detector element emitting emitted energy upon passage of a radiation quantum therethrough, said sensor field comprising a plurality of sensor elements in a matrix, each sensor element affected by said emitted energy emitting an electrical signal, and said evaluation unit identifying affected sensor elements, from among said plurality of sensor elements, that emit an electrical signal upon passage of said radiation quantum through said detector element and determining a spatial distribution of said affected sensor elements and, from said spatial distribution, determining a direction of incidence of said radiation quantum on said detector element, said sensor field and said evaluation unit, in combination, having an angular resolution for said direction in a range between 0.01° and 0.50°.

26. An x-ray medical diagnostic system comprising:
    an x-ray source that emits x-rays into an examination subject thereby producing radiation attenuated by the subject; and
    a detector arrangement for detecting said radiation, said detector arrangement comprising a radiation detector comprising a radiation-sensitive detector element, a sensor field, and an evaluation unit, said detector element emitting emitted energy upon passage of a radiation quantum therethrough, said sensor field comprising a plurality of sensor elements in a matrix, each sensor element affected by said emitted energy emitting an electrical signal, and said evaluation unit identifying affected sensor elements, from among said plurality of sensor elements, that emit an electrical signal upon passage of said radiation quantum through said detector element said radiation quantum generating a signal track across said affected sensor elements, said signal track having a beginning location, a length, and an end location, and determining a spatial distribution of said affected sensor elements and, from said spatial distribution, determining a direction of incidence of said radiation quantum on said detector element.

27. An x-ray medical diagnostic system comprising:
an x-ray source that emits x-rays into an examination subject thereby producing radiation attenuated by the subject and determining a spatial distribution of said affected sensor elements; and
a detector arrangement for detecting said radiation, said detector arrangement comprising a radiation detector comprising a radiation-sensitive detector element, a sensor field, and an evaluation unit, said detector element emitting emitted energy upon passage of a radiation quantum therethrough, said sensor field comprising a plurality of sensor elements in a matrix, each sensor element affected by said emitted energy emitting an electrical signal, and said evaluation unit identifying affected sensor elements, from among said plurality of sensor elements, that emit an electrical signal upon passage of said radiation quantum through said detector element and, from said spatial distribution, determining a direction of incidence of said radiation quantum on said detector element, said sensor field and said evaluation unit, in combination, having an angular resolution for said direction in a range between $0.01°$ and $0.50°$.

* * * * *